(12) United States Patent
Imai et al.

(10) Patent No.: US 6,184,663 B1
(45) Date of Patent: Feb. 6, 2001

(54) APPARATUS FOR DRIVING ELECTRIC LOAD

(75) Inventors: Hiroshi Imai, Kariya; Yoshiki Koyama, Okazaki; Shunji Mase, Handa, all of (JP)

(73) Assignee: Denso Corporation, Kariya (JP)

( * ) Notice: Under 35 U.S.C. 154(b), the term of this patent shall be extended for 0 days.

(21) Appl. No.: 09/384,223

(22) Filed: Aug. 27, 1999

(30) Foreign Application Priority Data

Aug. 28, 1998 (JP) .................................................. 10-243720
Jul. 13, 1999 (JP) .................................................. 11-199207

(51) Int. Cl.$^7$ ...................................................... G05F 1/40
(52) U.S. Cl. .......................... 323/274; 323/281; 323/349; 323/901; 323/908
(58) Field of Search .................................... 323/282, 901, 323/905, 908, 273, 274, 276, 277, 281, 349, 350

(56) References Cited

U.S. PATENT DOCUMENTS

| 4,987,348 | 1/1991 | Wong . | |
|---|---|---|---|
| 5,355,390 | 10/1994 | Yamamoto et al. . | |
| 5,859,506 | * | 1/1999 | Lemke ................................. 323/282 |
| 5,986,484 | * | 11/1999 | Kimata ................................. 323/908 |

FOREIGN PATENT DOCUMENTS

| 59-67704 | 4/1984 | (JP) . |
|---|---|---|
| 63-114317 | 5/1988 | (JP) . |
| 3-256407 | 11/1991 | (JP) . |

* cited by examiner

Primary Examiner—Peter S. Wong
Assistant Examiner—Gary L. Laxton
(74) Attorney, Agent, or Firm—Pillsbury Madison & Sutro LLP

(57) ABSTRACT

An apparatus for driving an electric load includes a switch device interposed in a current feed path from a direct-current power source to the electric load. A sensing resistor connected in series with the switch device operates for detecting a load current as a voltage value. The load current flows into the electric load via the switch device. A signal generation device operates for generating a trapezoidal wave signal in response to externally applied commands to turn on and turn off the electric load. The trapezoidal wave signal gradually varies from a first predetermined voltage to a second predetermined voltage when the electric load starts to be turned on. The trapezoidal wave signal gradually varies from the second predetermined voltage to the first predetermined voltage when the electric load starts to be turned off. A control device operates for comparing the trapezoidal wave signal generated by the signal generation device and the voltage value provided by the sensing resistor, and for controlling the switch device in response to a result of the comparing so that the load current will vary in accordance with the trapezoidal wave signal.

10 Claims, 4 Drawing Sheets

APPARATUS FOR DRIVING ELECTRIC LOAD

BACKGROUND OF THE INVENTION

1. Field of the Invention

This invention generally relates to an apparatus for driving an electric load or a current consumer. This invention particularly relates to an apparatus for driving an electric load such as a coil, an inductor, or a lamp whose internal resistance varies as it is energized.

2. Description of the Related Art

As an electric load such as a coil or a lamp is energized, it is heated and hence its internal resistance increases. Generally, a switching element is used to turn on and off the electric load. It is known to use a switching element or a current adjusting device to control the magnitude of a current flowing through the electric load. At the start of the energization of the electric load, the internal resistance of the electric load is low and thus a great current tends to flow therethrough. Such a great current is referred to as a turn-on inrush surge current. In some cases, the turn-on inrush surge current damages the switching element or the current adjusting device.

U.S. Pat. No. 4,987,348 corresponding to Japanese published unexamined patent application 3-256407 discloses a bilevel current limiting control circuit which enables a semiconductor controlled power switch with a limited power handling capability to operate near the inside border of the safe operating area (SOA) characteristic of the power switch. The control circuit is especially useful in limiting the turn-on inrush surge current to an incandescent lamp load supplied via the semiconductor power switch. The control circuit includes a series circuit made up of the power switch, a current sensing resistor and a lamp load connected to the terminals of a source of supply voltage. First and second comparison circuits, arranged to provide first and second different current limits for the control circuit, are connected to the sensing resistor. A third comparison circuit compares the load voltage with a reference voltage to control a selector device that selects the output of the first or second comparison circuit as a function of the level of the load voltage. The output of the selected comparison circuit is applied via a feedback circuit to a control electrode of the power switch so as to control the load current to the first and second current limit values as selected in response to the load voltage.

In the control circuit of U.S. Pat. No. 4,987,348, the load current is controlled to the first and second current limit values. When the lamp load is turned on, the load current abruptly increases to the upper limit current value. Such an abrupt increase in the load current tends to cause spike noise, that is, high-frequency noise. When the lamp load is turned off, the load current abruptly drops to a null level. Such an abrupt drop in the load current tends to cause spike noise (high-frequency noise). The spike noise may cause wrong operation of another control apparatus if it is propagated thereto.

SUMMARY OF THE INVENTION

It is an object of this invention to provide an apparatus for driving an electric load such as a coil or a lamp which can suppress or prevent spike noise when the electric load is turned on and off.

A first aspect of this invention provides an apparatus for driving an electric load. The apparatus comprises a switch means interposed in a current feed path from a direct-current power source to the electric load; a sensing resistor connected in series with the switch means for detecting a load current as a voltage value, the load current flowing into the electric load via the switch means; a signal generation means for generating a trapezoidal wave signal in response to externally applied commands to turn on and turn off the electric load, the trapezoidal wave signal gradually varying from a first predetermined voltage to a second predetermined voltage when the electric load starts to be turned on, the trapezoidal wave signal gradually varying from the second predetermined voltage to the first predetermined voltage when the electric load starts to be turned off; and a control means for comparing the trapezoidal wave signal generated by the signal generation means and the voltage value provided by the sensing resistor, and for controlling the switch means in response to a result of the comparing so that the load current will vary in accordance with the trapezoidal wave signal.

A second aspect of this invention is based on the first aspect thereof, and provides an apparatus wherein the sensing resistor is interposed in a current feed path from the direct-current power source to the switch means.

A third aspect of this invention is based on the first aspect thereof, and provides an apparatus wherein the switch means comprises a transistor having a control terminal, the transistor controlling the load current in response to an input voltage to the control terminal, and wherein the control means comprises an operational amplifier for generating a voltage signal depending on a voltage difference between the trapezoidal wave signal generated by the signal generation means and the voltage value provided by the sensing resistor, and means for controlling the input voltage to the control terminal of the transistor in response to an output voltage of the operational amplifier.

A fourth aspect of this invention is based on the third aspect thereof, and provides an apparatus wherein the operational amplifier comprises means for generating an offset voltage which enables the switch means to be surely changed to its OFF state when the electric load is required to be turned off.

A fifth aspect of this invention is based on the fourth aspect thereof, and provides an apparatus wherein the operational amplifier comprises a differential amplifier circuit forming an input stage, the differential amplifier circuit having input terminals and load transistors corresponding to the input terminals respectively, the load transistors being different in size from each other to suitably determine the offset voltage.

A sixth aspect of this invention is based on the first aspect thereof, and provides an apparatus wherein the signal generation means comprises means for generating the trapezoidal wave signal in response to a pulse signal having a duty cycle which is controlled to implement PWM control of the load current.

A seventh aspect of this invention provides an apparatus for driving an electric load. The apparatus comprises means for gradually increasing a load current, which flows through the electric load, from a null level to a predetermined level in accordance with a former portion of a trapezoidal waveform when the electric load is required to be turned on; and means for gradually decreasing the load current from the predetermined level to the null level in accordance with a latter portion of the trapezoidal waveform when the electric load is required to be turned off.

An eighth aspect of this invention provides an apparatus for driving an electric load. The apparatus comprises means for generating a first signal when the electric load is required to be turned on, the first signal having a waveform corresponding to a former portion of a trapezoidal waveform; means for generating a second signal representing a load current flowing through the electric load; means responsive to the first signal and the second signal for, when the electric load is required to be turned on, gradually increasing the load current from a null level to a predetermined level in accordance with the waveform of the first signal on a feedback control basis; means for generating a third signal when the electric load is required to be turned off, the third signal having a waveform corresponding to a latter portion of the trapezoidal waveform; and means responsive to the second signal and the third signal for, when the electric load is required to be turned off, gradually decreasing the load current from the predetermined level to the null level in accordance with the waveform of the third signal on a feedback control basis.

DESCRIPTION OF THE PREFERRED EMBODIMENTS

First Embodiment

Figure 1:
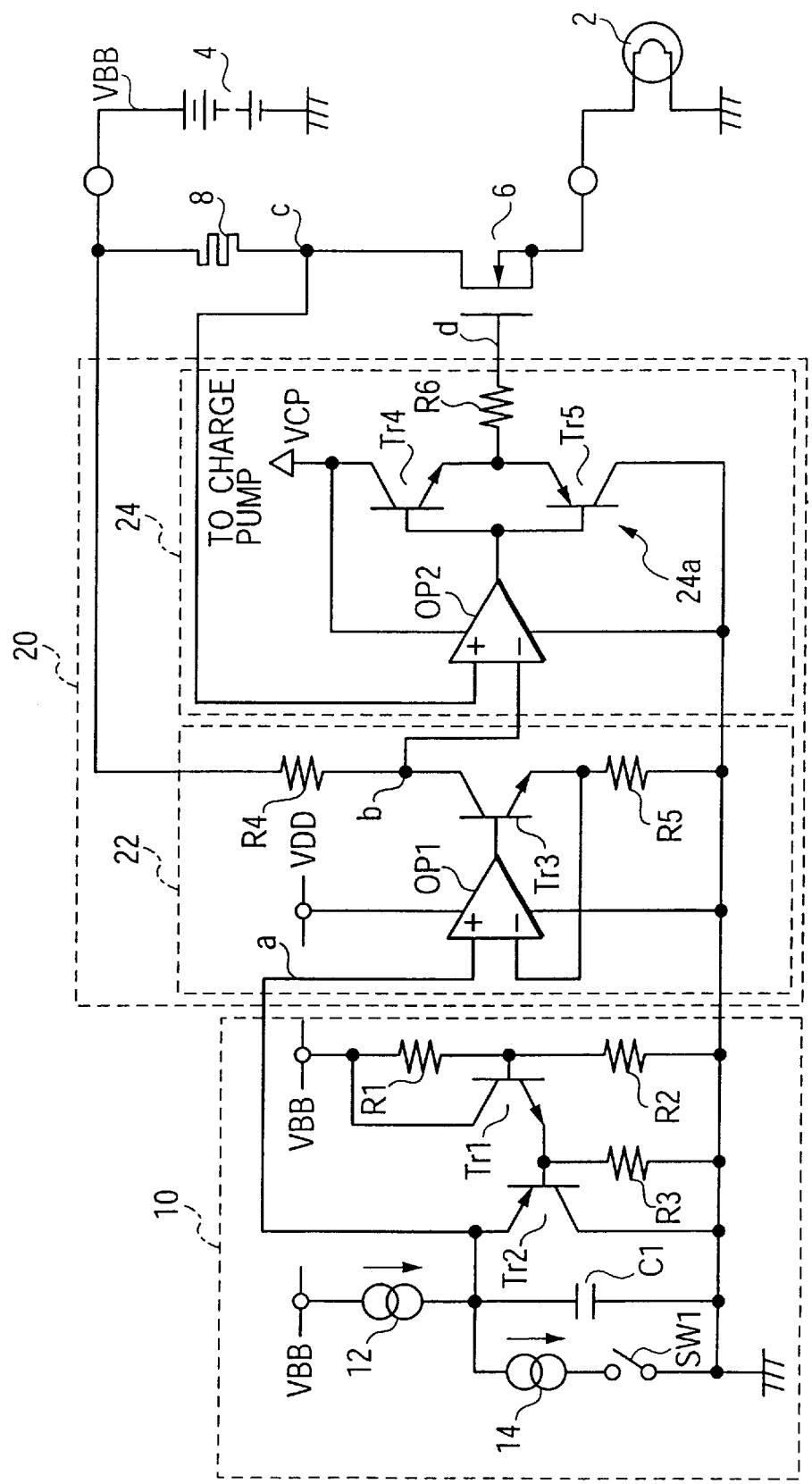
FIG. 1 is a diagram of an apparatus for driving an electric load according to a first embodiment of this invention.

With reference to FIG. 1, a driving apparatus according to a first embodiment of this invention turns on and off an electric load, for example, a lamp 2 in response to a command signal fed from an external. The lamp 2 is provided in, for example, a headlight of an automotive vehicle.

The driving apparatus of FIG. 1 includes an n-channel power MOSFET 6 which acts as a high side switch. The FET 6 is interposed in a power feed line extending from the positive terminal of a battery 4 to one end of the lamp 2. The negative terminal of the battery 4 and the other end of the lamp 2 are grounded. Specifically, the drain of the FET 6 is connected to one end of a current sensing resistor 8. The other end of the current sensing resistor 8 is connected to the positive terminal of the battery 4. The source of the FET 6 is connected to one end of the lamp 2. The other end of the lamp 2 is grounded. A load current generated by the battery 4 flows through the current sensing resistor 8, the drain-source path of the FET 6, and the lamp 2. The resistor 8 senses the load current. Specifically, the resistor 8 causes a signal voltage representing the load current. The load current is controlled in response to a voltage at the gate of the FET 6.

The driving apparatus of FIG. 1 further includes a trapezoidal wave generation circuit 10 and a load current control circuit 20. The trapezoidal wave generation circuit 10 produces a signal of a trapezoidal waveform in response to a command signal fed from an external. The trapezoidal wave generation circuit 10 outputs the trapezoidal wave signal to the load current control circuit 20. The load current control circuit 20 is connected to the current sensing resistor 8. The load current control circuit 20 receives the signal voltage representative of the load current from the current sensing resistor 8. The load current control circuit 20 is connected to the gate of the FET 6. The load current control circuit 20 compares the voltage of the trapezoidal wave signal and the signal voltage representative of the load current. The load current control circuit 20 adjusts a voltage at the gate of the FET 6 in response to the result of the voltage comparison so that the load current will vary as a trapezoidal waveform corresponding to the trapezoidal wave signal. In other words, the load current control circuit 20 adjusts the load current into waveform agreement with the trapezoidal wave signal on a feedback control basis.

The trapezoidal wave signal produced by the trapezoidal wave generation circuit 10 varies as follows. The voltage of the trapezoidal wave signal starts to rise from a ground level in response to a signal of a command to turn on the lamp 2. The voltage of the trapezoidal wave signal gradually rises at a given slope or a given rate until reaching a predetermined reference level (a predetermined reference voltage) VBB/n. The voltage of the trapezoidal wave signal continues to be stably equal to the reference level VBB/n after reaching it. The reference voltage VBB/n is provided by dividing a battery voltage VBB, that is, a voltage across the battery 4. The voltage of the trapezoidal wave signal starts to drops from the reference level VBB/n in response to a signal of a command to turn off the lamp 2. The voltage of the trapezoidal wave signal gradually drops at a given slope or a given rate until reaching the ground level. The voltage of the trapezoidal wave signal continues to be stably equal to the ground level after reaching it.

The trapezoidal wave generation circuit 10 includes a voltage dividing resistors R1 and R2, an NPN transistor Tr1, and a PNP transistor Tr2. One end of the resistor R1 is connected to a positive power feed line leading from the positive terminal of the battery 4. The other end of the resistor R1 is connected to one end of the resistor R2. The other end of the resistor R2 is connected to a ground line (a line grounded). The resistors R1 and R2 divide the battery voltage VBB, thereby generating the reference voltage VBB/n at the junction therebetween. The collector of the transistor Tr1 is connected to the positive power feed line. The base of the transistor Tr1 is connected to the junction between the voltage dividing resistors R1 and R2. The emitter of the transistor Tr1 is connected via a resistor R3 to the ground line. The emitter of the transistor Tr2 is connected to a trapezoidal wave output line leading to the load current control circuit 20. A point "a" is defined on the trapezoidal wave output line. The trapezoidal wave signal produced by the trapezoidal wave generation circuit 10 appears on the trapezoidal wave output line. The base of the transistor Tr2 is connected to the junction between the resistor R3 and the emitter of the transistor Tr1. The collector of the transistor Tr2 is connected to the ground line.

The trapezoidal wave generation circuit 10 further includes a capacitor C1, a switch SW1, and constant current circuits 12 and 14. The capacitor C1 is connected between the emitter and the collector of the transistor Tr2. Thus, the capacitor C1 is connected between the trapezoidal wave output line and the ground line. An input end of the constant current circuit 12 is connected to the positive power feed line. An output end of the constant current circuit 12 is connected to the trapezoidal wave output line or the junction between the capacitor C1 and the emitter of the transistor Tr2. The constant current circuit 12 causes a constant current "i" to flow from the positive power feed line toward the capacitor C1. An input end of the constant current circuit 14 is connected to the trapezoidal wave output line or the junction among the constant current circuit 12, the capacitor C1, and the emitter of the transistor Tr2. An output end of the constant current circuit 14 is connected via the switch SW1 to the ground line. When the switch SW1 is closed, that is, when the switch SW1 is changed to its ON state, the constant current circuit 14 causes a constant current "2i" to flow toward the ground line. The constant current "2i" is equal to, for example, twice the constant current "i" provided by the constant current circuit 12. The switch SW1 is closed and opened (that is, changed between its ON state and its OFF state) in response to a command signal fed from an external. When the command signal requires the lamp 2 to be turned on, the switch SW1 is opened (that is, changed to its OFF state). When the command signal requires the lamp 2 to be turned off, the switch SW1 is closed (that is, changed to its ON state).

The trapezoidal wave generation circuit 10 operates as follows. Since the reference voltage VBB/n generated by the voltage dividing resistors R1 and R2 is applied to the base of the transistor Tr1, the transistor Tr1 is in its ON state. The voltage (VBB/n−Vf) at the emitter of the transistor Tr1 is equal to the reference voltage VBB/n minus the base-to-emitter voltage Vf (about 0.7 V) of the transistor Tr1. The voltage (VBB/n−Vf) at the emitter of the transistor Tr1 is applied to the base of the transistor Tr2.

Figure 2:
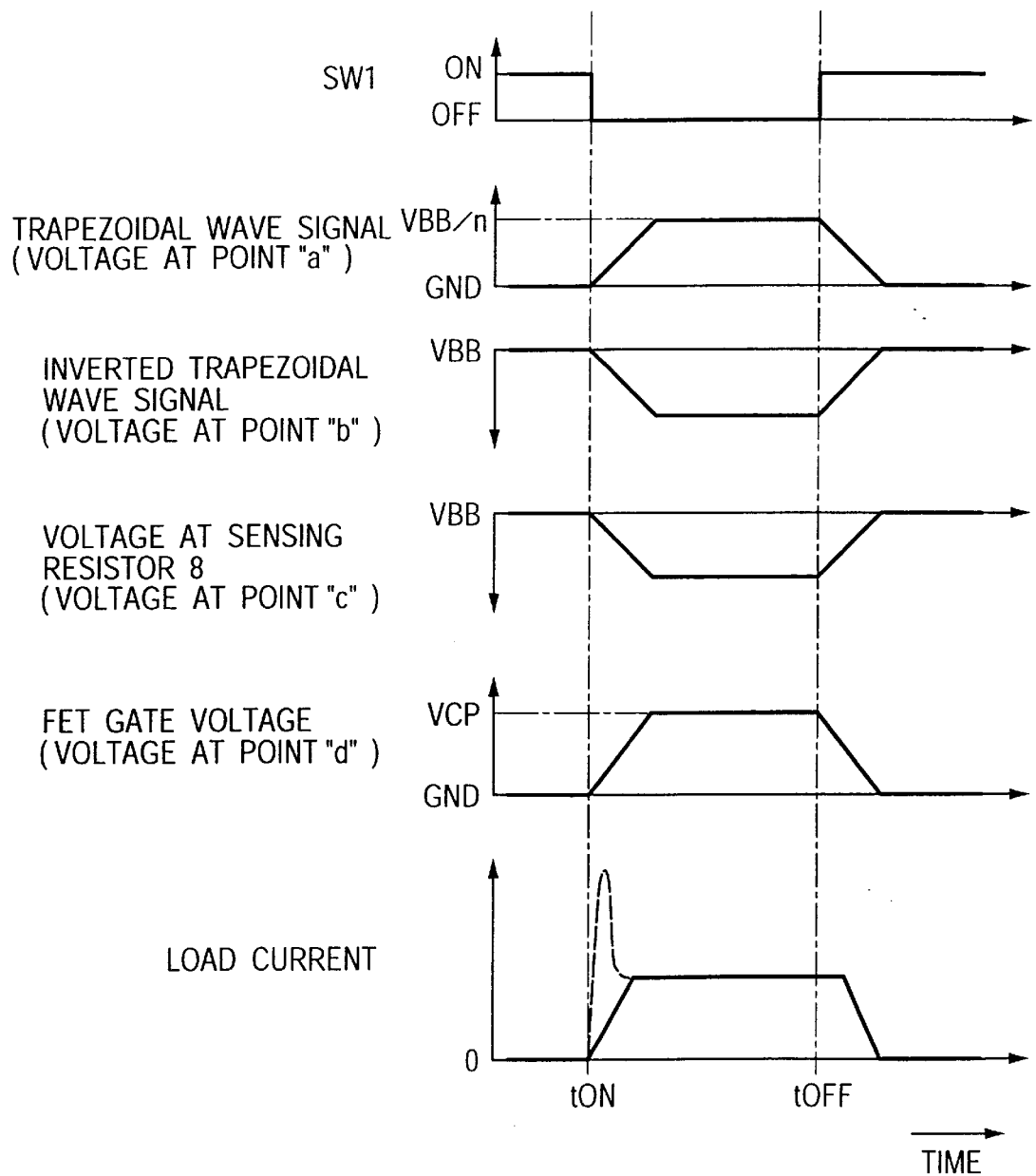
FIG. 2 is a time-domain diagram of the state of a switch, and conditions of voltages and a load current in the apparatus of FIG. 1.

In the case where the switch SW1 remains open (OFF), that is, in the case where the lamp 2 is turned on, the constant current circuit 14 does not operate so that the capacitor C1 continues to be charged by the constant current "i" fed via the constant current circuit 12. As a result, the voltage at the emitter of the transistor Tr2 rises above the voltage at the base thereof. Thus, a base current flows through the transistor Tr2, and the transistor Tr2 changes to its ON state. When the transistor Tr2 is in its ON state, the voltage at the emitter of the transistor Tr2 is equal to the voltage at the base thereof plus the emitter-to-base voltage Vf thereof. Accordingly, the voltage at the emitter of the transistor Tr2 is equal to the reference level VBB/n. Thus, as shown in FIG. 2, the voltage at the trapezoidal wave output line (the voltage at the point "a") is stably equal to the reference level VBB/n when the switch SW1 remains open (OFF).

At a moment "tOFF" (see FIG. 2), the switch SW1 is closed or is changed to its ON state to turn off the lamp 2. When the switch SW1 is closed, the constant current circuit 14 starts to operate and the capacitor C1 starts to be discharged. In this case, a constant discharging current (a constant current "2i") flows through the constant current circuit 14 and the switch SW1. As the capacitor C1 is discharged, the voltage at the trapezoidal wave output line (the voltage at the point "a") drops from the reference level VBB/n and a base current through the transistor Tr2 decreases. Then, the transistor Tr2 falls into its OFF state, and the voltage at the trapezoidal wave output line (the voltage at the point "a") drops to the ground level. Thus, in the case where the switch SW1 is changed to its ON state, the voltage at the trapezoidal wave output line (the voltage at the point "a") gradually drops from the reference level VBB/n to the ground level at a given slope or a given rate as shown in FIG. 2. The slope or rate of the voltage drop is determined by the constant current "2i" through the constant current circuit 14 and also the capacitance of the capacitor C1. The voltage at the trapezoidal wave output line (the voltage at the point "a") continues to be stably equal to the ground level after reaching it.

At a moment "tON" (see FIG. 2), the switch SW1 is opened or is changed to its OFF state to turn on the lamp 2. When the switch SW1 is opened, operation of the constant current circuit 14 is suspended and the capacitor C1 starts to be charged. In this case, a constant charging current (a constant current "i") flows into the capacitor C1 via the constant current circuit 12. As the capacitor C1 is charged, the voltage at the trapezoidal wave output line (the voltage at the point "a") rises from the ground level and a base current starts to flow through the transistor Tr2. Then, the transistor Tr2 changes to its ON state, and the voltage at the trapezoidal wave output line (the voltage at the point "a") rises to the reference level VBB/n. Thus, in the case where the switch SW1 is changed to its OFF state, the voltage at the trapezoidal wave output line (the voltage at the point "a") gradually rises from the ground level to the reference level VBB/n at a given slope or a given rate as shown in FIG. 2. The slope or rate of the voltage rise is determined by the constant current "i" through the constant current circuit 12 and also the capacitance of the capacitor C1. The voltage at the trapezoidal wave output line (the voltage at the point "a") continues to be stably equal to the reference level VBB/n after reaching it.

As shown in FIG. 1, the load current control circuit 20 includes a voltage converting portion 22 and a controlling portion 24. The voltage converting portion 22 receives the trapezoidal wave signal from the trapezoidal wave generation circuit 10. The base level of the received trapezoidal wave signal is equal to the ground level. The voltage converting portion 22 inverts the received trapezoidal wave signal into a second trapezoidal wave signal whose base level is equal to the positive battery voltage VBB (see FIG. 2). The second trapezoidal wave signal appears at a point "b" on a signal line connecting the voltage converting portion 22 and the controlling portion 24. The controlling portion 24 receives the second trapezoidal wave signal from the voltage converting portion 22. The controlling portion 24 receives a signal voltage at the junction (a point "c") between the current sensing resistor 8 and the FET 6 which represents the load current. The controlling portion 24 compares the second trapezoidal wave signal and the signal voltage. The controlling portion 24 adjusts a voltage at the gate of the FET 6 in response to a result of the comparison so that the signal voltage will be accorded with the second trapezoidal wave signal.

The voltage converting portion 22 includes resistors R4 and R5, an NPN transistor Tr3, and an operational amplifier OP1. One end of the resistor R4 is connected to the positive terminal of the battery 4. The other end of the resistor R4 is connected to the collector of the transistor Tr3. One end of the resistor R5 is connected to the emitter of the transistor Tr3. The other end of the resistor R5 is connected to the ground line (the line grounded). The non-inverting input terminal of the operational amplifier OP1 is connected to the trapezoidal wave output line (the point "a") leading from the trapezoidal wave generation circuit 10. The inverting input terminal of the operational amplifier OP1 is connected to the junction between the resistor R5 and the emitter of the transistor Tr3. The output terminal of the operational amplifier OP1 is connected to the base of the transistor Tr3. The operational amplifier OP1 is powered by a constant voltage VDD (for example, 5 V) lower than the battery voltage VBB.

In the voltage converting portion 22, the operational amplifier OP1 controls the transistor Tr3 so that the voltage at the junction between the resistor R5 and the emitter of the transistor Tr3 will be accorded with the trapezoidal wave signal outputted from the trapezoidal wave generation circuit 10. As the voltage of the trapezoidal wave signal rises, a greater current flows through the transistor Tr3. The voltage at the collector of the transistor Tr3, that is, the voltage at the junction (the point "b") between the resistor R4 and the collector of the transistor Tr3 is equal to the battery voltage VBB minus a voltage corresponding to the trapezoidal wave signal (see FIG. 2). Thus, the voltage at the point "b" agrees with an inversion of the trapezoidal wave signal. The voltage at the point "b" is outputted from the voltage converting portion 22 to the controlling portion 24 as a second trapezoidal wave signal.

The controlling portion 24 includes an operational amplifier OP2 a push-pull circuit 24a, and a resistor R6. The push-pull circuit 24a has a pair of an NPN transistor Tr4 and a PNP transistor Tr5. The inverting input terminal of the operational amplifier OP2 is connected to the point "b" in the voltage converting portion 22. Therefore, the inverting input terminal of the operational amplifier OP2 receives the second trapezoidal wave signal from the voltage converting portion 22. The non-inverting input terminal of the operational amplifier OP2 is connected to the junction (the point "c") between the current sensing resistor 8 and the FET 6. Therefore, the non-inverting input terminal of the operational amplifier OP2 receives the signal voltage representing the load current. The operational amplifier OP2 responds to the second trapezoidal wave signal and the signal voltage, thereby outputting a signal for equalizing the signal voltage to the second trapezoidal wave signal. The output terminal of the operational amplifier OP2 is connected to an input side of the push-pull circuit 24a. The push-pull circuit 24a receives the output signal of the operational amplifier OP2. An output side of the push-pull circuit 24a is connected to the gate of the FET 6 via the resistor R6. The operational amplifier OP2 can control the voltage at the gate of the FET 6 via the push-pull circuit 24a.

In the push-pull circuit 24a, the bases of the transistors Tr4 and Tr5 are connected to each other. In addition, the emitters of the transistors Tr4 and Tr5 are connected to each other. The collector of the transistor Tr4 is connected to a positive power feed line leading from a charge pump. Thus, the collector of the transistor Tr4 is subjected to a power supply voltage VCP higher than the battery voltage VBB. The collector of the transistor Tr5 is connected to the ground line (the line grounded). The bases of the transistors Tr4 and Tr5 are connected to the output terminal of the operational amplifier OP2. The emitters of the transistors Tr4 and Tr5 are connected to the gate of the FET 6 via the resistor R6.

The operational amplifier OP2 in the controlling portion 24 is powered by the power supply voltage VCP higher than the battery voltage VBB. Also, the push-pull circuit 24a is powered by the power supply voltage VCP. Accordingly, a voltage which is higher than the battery voltage VBB by at least a threshold voltage of the FET 6 can be applied to the gate of the FET 6. Thus, the FET 6 can be reliably controlled.

The junction between the resistor R6 and the gate of the FET 6 is defined as a point "d". The operational amplifier OP2 and the push-pull circuit 24a cooperate to adjust the voltage at the gate of the FET 6 (that is, the voltage at the point "d") so that the signal voltage at the point "c" will be accorded with the second trapezoidal wave signal. As shown in FIG. 2, the voltage at the gate of the FET 6 varies in accordance with the trapezoidal wave signal produced by the trapezoidal wave generation circuit 10. The upper limit of the range of the variation in the voltage at the gate of the FET 6 is determined by the power supply voltage VCP, while the lower limit thereof is provided by the ground level. As shown in FIG. 2, the load current varies in accordance with the voltage at the gate of the FET 6, that is, the trapezoidal wave signal produced by the trapezoidal wave generation circuit 10.

Therefore, the load current which flows through the lamp 2 is prevented from abruptly rising when the lamp 2 is turned on. An abrupt rise in the load current is denoted by the broken line in FIG. 2. The prevention of an abrupt rise in the load current suppresses spike noise (high-frequency noise). In addition, the prevention of an abrupt rise in the load current is advantageous to a longer life of the lamp 2. Also, the load current which flows through the lamp 2 is prevented from abruptly dropping when the lamp 2 is turned off. The prevention of an abrupt drop in the load current suppresses spike noise (high-frequency noise).

The current sensing resistor 8 is provided between the positive terminal of the battery 4 and the drain of the RET 6. In this case, the signal voltage which represents the load current appears at the junction (the point "c") between the current sensing resistor 8 and the drain of the FET 6. Accordingly, to take out the signal voltage, it is sufficient to provide a connection to the junction (the point "c") between the current sensing resistor 8 and the drain of the FET 6. Thus, a circuit for taking out the signal voltage is simple.

As previously mentioned, the controlling portion 24 of the load current control circuit 20 includes the operational amplifier OP2. The operational amplifier OP2 acts as a device for controlling the load current. Specifically, the operational amplifier OP2 generates a signal depending on the difference between the voltage of the second trapezoidal wave signal outputted from the voltage converting portion 22 and the signal voltage representing the load current. Thus, the operational amplifier OP2 implements a differential process. The voltage at the gate of the FET 6 is controlled according to the differential process by the operational amplifier OP2. The differential process by the operational amplifier OP2 prevents the load current from pulsating. The differential process enables the load current to linearly vary in accordance with the second trapezoidal wave signal. Thus, the load current is stably controlled, and spike noise (high-frequency noise) is prevented from occurring.

Figure 3:
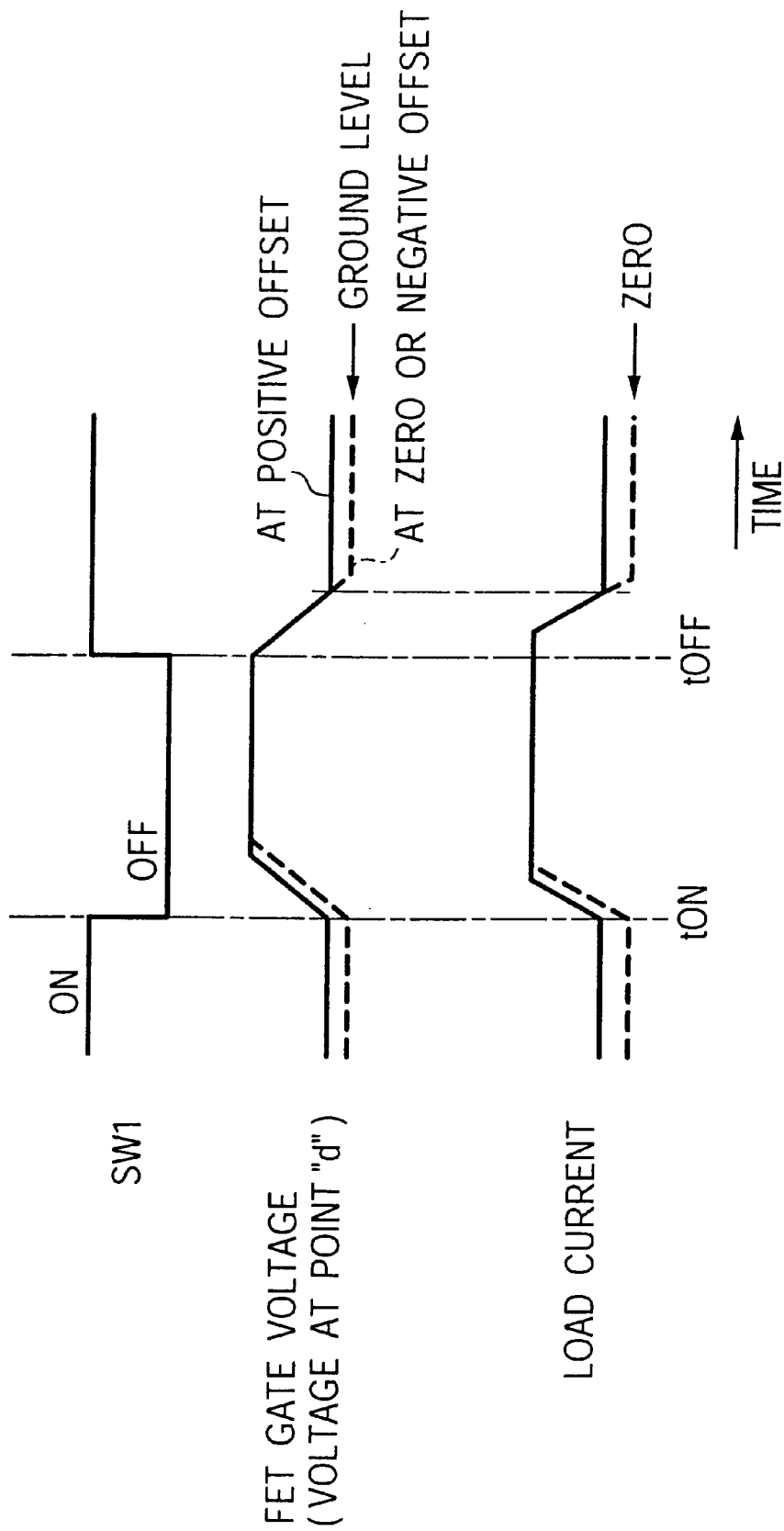
FIG. 3 is a time-domain diagram of the state of a switch, and conditions of a voltage and a load current which occur in an assumed case.

The output signal of the operational amplifier OP2 has a component corresponding to an offset voltage. It is assumed that the offset voltage is positive. With reference to FIG. 3, in the assumed case, when the switch SW1 is in its ON state and the voltage of the trapezoidal wave signal outputted from the trapezoidal wave generation circuit 10 is equal to the ground level, the voltage of the output signal of the operational amplifier OP2 is higher than the ground level by a value corresponding to the positive offset voltage. At the same time, the voltage at the gate of the FET 6 (the voltage at the point "d") is also higher than the ground level by a value corresponding to the positive offset voltage. Thus, in the assumed case, while the switch SWI remains in its ON state, a small load current continues to flow through the FET 6 and the lamp 2. To prevent such an expected problem, the offset voltage in the operational amplifier OP2 is set negative.

Figure 4:
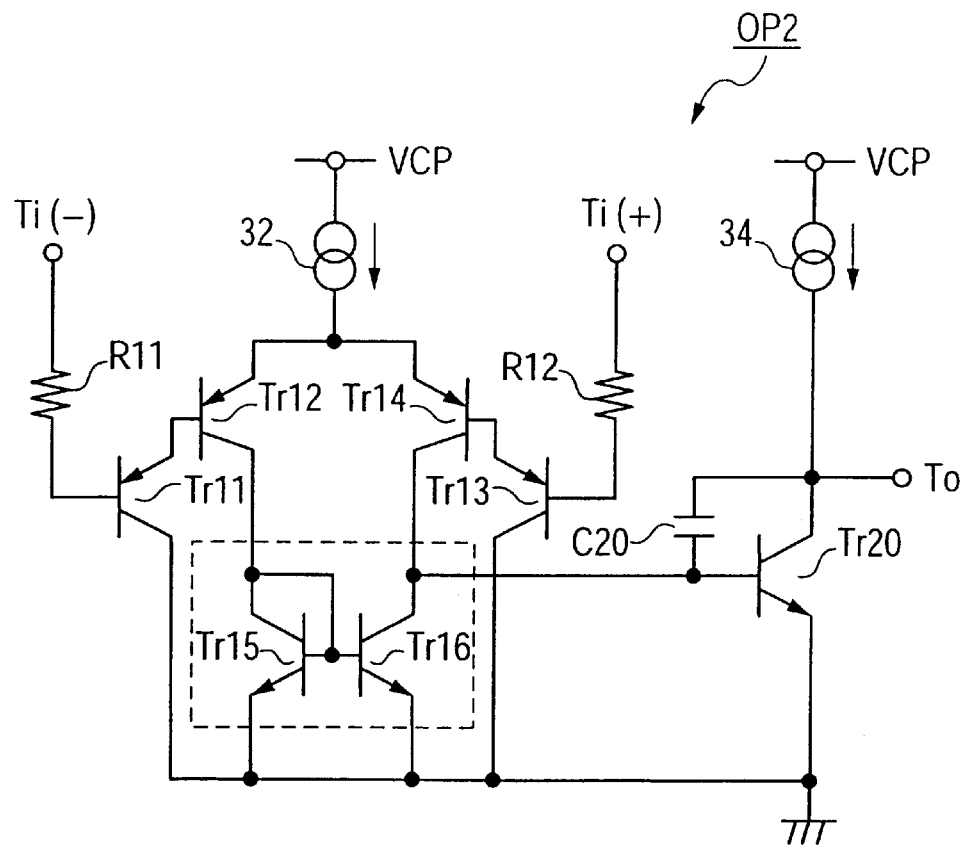
FIG. 4 is a diagram of an operational amplifier in FIG. 1.

With reference to FIG. 4, a front stage (an input stage) of the operational amplifier OP2 is formed by a differential amplifier circuit including a constant current circuit 32. An input end of the constant current circuit 32 is connected to the positive power feed line subjected to the power supply voltage VCP. An output end of the constant current circuit 32 is connected to an inner portion of the differential amplifier circuit. A constant current flows into the inner portion of the differential amplifier circuit via the constant current circuit 32. The differential amplifier circuit includes transistors Tr11–Tr16 which are powered by the constant current fed via the constant current circuit 32. The operational amplifier OP2 has the non-inverting input terminal Ti(+) and the inverting input terminal Ti(−) which lead to the differential amplifier circuit. A combination of the transistors Tr11–Tr16 operates in response to signals applied to the non-inverting input terminal Ti(+) and the inverting input terminal Ti(−), and generates a signal depending on the voltage difference between the applied signals.

Specifically, the transistor Tr11 is of the PNP type. The base of the transistor Tr11 is connected to the inverting input terminal Ti(−) via a resistor R11. The collector of the transistor Tr11 is connected to a ground line (a line grounded). The transistor Tr12 is of the PNP type. The base of the transistor Tr12 is connected to the emitter of the transistor Tr11. The emitter of the transistor Tr12 is connected to the output end of the constant current circuit 32. The transistor Tr13 is of the PNP type. The base of the transistor Tr13 is connected to the non-inverting input terminal Ti(+) via a resistor R12. The collector of the transistor Tr13 is connected to the ground line. The transistor Tr14 is of the PNP type. The base of the transistor Tr14 is connected to the emitter of the transistor Tr13. The emitter of the transistor Tr14 is connected to the output end of the constant current circuit 32. The transistor Tr15 is of the NPN type. The collector of the transistor Tr15 is connected to the collector of the transistor Tr12. The emitter of the transistor Tr15 is connected to the ground line. The base of the transistor Tr15 is connected to the collector thereof. The transistor Tr16 is of the NPN type. The collector of the transistor Tr16 is connected to the collector of the transistor Tr14. The emitter of the transistor Tr16 is connected to the ground line. The base of the transistor Tr16 is connected to the base of the transistor Tr15. The transistor Tr16 forms a current mirror with respect to the transistor Tr15.

The operational amplifier OP2 includes an NPN transistor Tr20 and a constant current circuit 34. The transistor Tr20 acts as a signal outputting device. The operational amplifier OP2 has the output terminal To. An input end of the constant current circuit 34 is connected to the positive power feed line subjected to the power supply voltage VCP. An output end of the constant current circuit 34 is connected to the collector of the transistor Tr20. The junction between the output end of the constant current circuit 34 and the collector of the transistor Tr20 is connected to the output terminal To. The base of the transistor Tr20 is connected to the junction between the collectors of the transistors Tr14 and Tr16. The emitter of the transistor Tr20 is connected to the ground line. A capacitor C20 for phase compensation is connected between the collector and the base of the transistor Tr20.

The emitter area of the transistor Tr15 related to the inverting input terminal Ti(−) is set greater than that of the transistor Tr16 related to the non-inverting input terminal Ti(+) so that the offset voltage developed in the operational amplifier OP2 will be negative.

Figure 5:
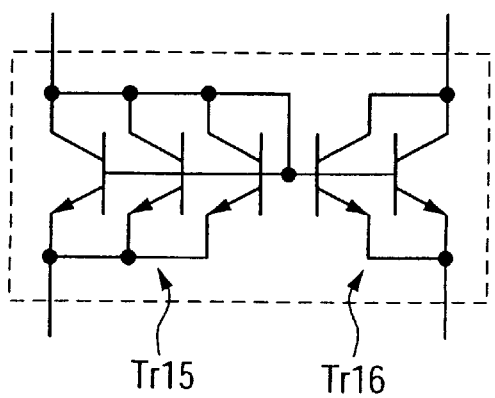
FIG. 5 is a diagram of transistors in FIG. 4.

Specifically, as shown in FIG. 5, the transistor Tr15 is composed of three sub transistors connected in parallel and having equal sizes, whereas the transistor Tr16 is formed by a parallel combination of two sub transistors having sizes equal to those of the sub transistors in the transistor Tr15. In this case, the emitter area of the transistor Tr15 is equal to the emitter area of the transistor Tr16 which is multiplied by a factor of about 1.5. Thus, the offset voltage in the operational amplifier OP2 is negative.

The negative offset voltage in the operational amplifier OP2 enables the FET 6 to surely fall into its ideal OFF state after the switch SW1 is changed to its ON state. Thus, the load current which flows through the lamp 2 is reliably nullified after the switch SW1 is changed to its ON state.

Second Embodiment

A second embodiment of this invention is similar to the first embodiment thereof except for design changes indicated hereinafter. In the second embodiment of this invention, the FET 6 is interposed in the current feed path between the lamp 2 and the ground line. The current sensing resistor 8 is provided between the FET 6 and the ground line.

Third Embodiment

A third embodiment of this invention is similar to the first embodiment thereof or the second embodiment thereof except for design changes indicated hereinafter. The third embodiment of this invention uses PWM (pulse width modulation) control to vary the effective value or the mean value of a load current flowing through the lamp 2 while the lamp 2 remains turned on. The variation in the effective value of the load current results in a variation in the brightness of the lamp 2.

According to the third embodiment of this invention, the load current which flows through the lamp 2 is controlled in response to a PWM signal (a pulse signal having a variable pulse width). In addition, the duty cycle of the PWM signal is varied to change the effective value of the load current. Preferably, the PWM signal has a predetermined frequency. Specifically, the switch SW1 is changed between its ON state and its OFF state in response to a PWM signal (a pulse signal) having a variable duty cycle and a predetermined frequency. The duty cycle of the PWM signal determines the ratio between every time interval for which the switch SW1 remains in its OFF state and every time interval for which the switch SW1 remains in its ON state. In other words, the duty cycle of the PWM signal determines the ratio between every time interval for which the load current flows through the lamp 2 and every time interval for which the load current remains inhibited from flowing through the lamp 2. Thus, the effective value of the load current depends on the duty cycle of the PWM signal. It is possible to stably control the load current without generating spike noise (high-frequency noise).

Fourth Embodiment

A fourth embodiment of this invention is similar to one of the first, second, and third embodiments thereof except that the lamp 2 is replaced by another electric load whose internal resistance increases as the load is energized.

What is claimed is:

1. An apparatus for driving an electric load, comprising:
   a switch means interposed in a current feed path from a direct-current power source to the electric load for continuously varying an electric current flowing along the current feed path:
   a sensing resistor connected in series with the switch means for detecting a load current as a voltage value, the load current flowing into the electric load via the switch means:
   a trapezoidal wave generation circuit for generating a trapezoidal wave signal in response to externally applied commands to turn on and turn off the electric load, the trapezoidal wave signal having a trapezoidal waveform, the trapezoidal wave signal gradually varying from a first predetermined voltage to a second predetermined voltage when the electric load is turned on, the trapezoidal wave signal gradually varying from the second predetermined voltage to the first predetermined voltage when the electric load is turned off; and a control means for comparing the trapezoidal wave signal generated by the trapezoidal wave generation circuit and the voltage value provided by the sensing resistor, and for controlling the switch means in response to a result of the comparing so that the load current will vary in a trapezoidal shape in accordance with the trapezoidal wave signal.

2. An apparatus as recited in claim 1, wherein the sensing resistor is interposed in a current feed path from the direct-current power source to the switch means.

3. An apparatus as recited in claim 1, wherein the switch means comprises a transistor having a control terminal, and the transistor controls the load current in response to an input voltage to the control terminal, and wherein the control means comprises an operational amplifier for generating a voltage signal depending on a voltage difference between the trapezoidal wave signal generated by the trapezoidal wave generation circuit and the voltage value provided by the sensing resistor, and means for controlling the input voltage to the control terminal of the transistor in response to an output voltage of the operational amplifier.

4. An apparatus as recited in claim 3, wherein the operational amplifier comprises means for generating an offset voltage which enables the switch means to be surely changed to its OFF state when the electric load is turned off.

5. An apparatus as recited in claim 4, wherein the operational amplifier comprises a differential amplifier circuit forming an input stage, the differential amplifier circuit having input terminals and load transistors corresponding to the input terminals respectively, the load transistors being different in size from each other to suitably determine the offset voltage.

6. An apparatus as recited in claim 1, wherein the trapezoidal wave generation circuit comprises means for generating the trapezoidal wave signal in response to a pulse signal having a duty cycle which is controlled to implement PWM control of the load current.

7. An apparatus for driving an electric load, comprising:

means for gradually increasing a load current, which flows through the electric load, from a null level to a predetermined level in accordance with a first portion of a trapezoidal waveform when the electric load is turned on; and means for gradually decreasing the load current from the predetermined level to the null level in accordance with a second portion of the trapezoidal waveform when the electric load is turned off, the second portion following the first portion.

8. An apparatus for driving an electric load, comprising:

means for generating a first signal when the electric load is turned on, the first signal having a waveform corresponding to a first portion of a trapezoidal waveform;

means for generating a second signal representing a load current flowing through the electric load;

means responsive to the first signal and the second signal for, when the electric load is turned on, gradually increasing the load current from a null level to a predetermined level in accordance with the waveform of the first signal on a feedback control basis;

means for generating a third signal when the electric load is turned off, the third signal having a waveform corresponding to a second portion of the trapezoidal waveform, the second portion following the first portion; and means responsive to the second signal and the third signal for, when the electric load is turned off, gradually decreasing the load current from the predetermined level to the null level in accordance with the waveform of the third signal on a feedback control basis.

9. An apparatus as recited in claim 1, wherein the control means comprises means for applying a voltage to the switch means, and means for varying the voltage applied to the switch in a trapezoidal form in response to the result of the comparing.

10. An apparatus as recited in claim 7, wherein the increasing means and the decreasing means comprise common means for continuously varying the load current, wherein the increasing means comprises means for controlling the varying means in response to a trapezoidal wave signal to gradually increase the load current, and wherein the decreasing means comprises means for controlling the varying means in response to the trapezoidal wave signal to gradually decrease the load current.

* * * * *